United States Patent [19]

Bormioli

[11] Patent Number: 4,577,833

[45] Date of Patent: Mar. 25, 1986

[54] HOSE FITTING WITH AUTOMATIC SEPARATION UNDER STRONG TENSILE STRESS

[76] Inventor: Giorgio Bormioli, via Galileo Galilei,, 11-35100 Padova, Italy

[21] Appl. No.: 588,450

[22] Filed: Mar. 12, 1984

[30] Foreign Application Priority Data

Apr. 20, 1983 [IT] Italy ............................... 20686 A/83

[51] Int. Cl.⁴ ........................................... F16L 29/00
[52] U.S. Cl. .................................... 251/149.1; 285/1;
285/317; 285/102; 137/614.03; 251/149.8
[58] Field of Search ................. 285/1, 2, 83, 102, 306,
285/317; 251/149.1, 149.8, 149.9, 94;
137/614.03, 614.05

[56] References Cited

U.S. PATENT DOCUMENTS

| | | | |
|---|---|---|---|
| 2,943,636 | 7/1960 | Reed et al. .................. | 137/614.03 |
| 3,215,161 | 11/1965 | Goodwin et al. ............ | 285/102 |
| 3,567,255 | 3/1971 | Evans ........................... | 285/1 |
| 3,781,039 | 12/1973 | Locke et al. ................ | 285/1 |
| 4,124,228 | 11/1978 | Morrison .................... | 285/317 |
| 4,150,691 | 4/1979 | Maldava ..................... | 137/614.03 |
| 4,348,039 | 9/1982 | Miller .......................... | 285/1 |

FOREIGN PATENT DOCUMENTS 2520669 11/1976 Fed. Rep. of Germany ... 251/149.8

Primary Examiner—Larry Jones
Attorney, Agent, or Firm—Shlesinger, Fitzsimmons & Shlesinger

[57] ABSTRACT

The fitting comprises a tubular outer casing provided with a fixed inlet portion and an axially movable outlet portion. Inside the casing there is provided a releasable connection system, which in response to a strong stress of mutual removal of said casing portions causes the axial removal of said outlet portion, eventually in combination with the moving of a shutter to a closing position of said inlet portion.

8 Claims, 4 Drawing Figures

HOSE FITTING WITH AUTOMATIC SEPARATION UNDER STRONG TENSILE STRESS

The present invention relates to a hose fitting, which is able to automatically carry out the separation of the hoses, and eventually the closing of the pressurized one, under strong tensile stress.

In the transfer art for fluid oil products it is common to use flexible pipes or hoses, which come from two terminal locations (for example an underwater delivery mouth and a cargo ship) and are provisionally connected to each other by means of suitable fittings.

An important requirement for said fittings is to automatically operate the separation of the two hoses as soon as there occurs (for example for rough sea) a condition of tensile stress higher than a maximum acceptable value. Otherwise, in fact, extremely serious damages could result for the whole system.

At the same time, of course, it must be avoided that such automatic operation occurs as a result of simple thrust by the fed product.

It is also desirable to cause the sudden separation of the two hoses when necessary.

The object of the present invention is to realize a hose fitting, which is does not respond to separation effects due to the product under pressure, nor to however caused low tensile stresses, but at the same time is able to respond to possible strong tensile stresses of any origin by effecting the separation of the connected hoses.

According to the invention such object is reached by a fitting characterized in that it comprises a fluid product conveying tubular casing, provided with a fixed inlet portion attachable to a first hose and with an axially removable outlet portion attachable to a second hose, a fixed cylinder coaxially connected to said casing inlet portion, a piston slidingly housed in said fixed cylinder, thrust means acting on said piston to push it towards said inlet portion with a force higher than the removing one exerted on said outlet portion by the fluid product fed from said inlet portion, an axially movable cylinder coaxially housed in said fixed cylinder and integral with said piston, and releasable connection means for said movable cylinder and said casing outlet portion, which means, in response to a mutual removal stress of said casing inlet and outlet portions, are able to cause firstly the integral motion of said casing outlet portion, said movable cylinder and said piston with respect to said casing inlet portion against the action of said thrust means and then, if said stress is higher than a predetermined value, the release of said releasable connection means for the axial removal of said casing outlet portion.

In other words, the construction is such that, while in normal operating conditions, or with a low tensile stress, the removable outlet portion of the outer casing of the fitting is connected to the movable cylinder and consequently to the piston and, finally, to the main body of the same casing. However, under high tensile stress, whether due to facts independent from the operator or on the contrary purposefully caused, the above mentioned outlet portion separates from the movable cylinder, and consequently from the main body of the fitting, thus uncoupling the two hoses.

According to a preferred embodiment of the present invention it is also provided that the fitting also includes a closing shutter for said inlet portion, a further piston slidingly housed in said movable cylinder and integral with said closing shutter, further thrust means acting on said further piston to push it towards said casing outlet portion against a hydraulic retaining force which pushes it backwards towards a shutter opening position, and a discharge with prefixed calibration, which can be opened upon the removal of said casing outlet portion for the annulment of said hydraulic retaining force and the consequent advancement of said further piston to effect the displacement of said shutter to a closing position.

In such way it is obtained that the separation of the two hoses is also accompanied by the automatic closing of the inlet portion of the fitting and by the consequent interruption of the distribution of the product from the hose connected thereto.

This second operation is slightly delayed with respect to the first one, so as to avoid dangerous fluid hammers due to sudden changes of pressure in the supply hose.

The features of the present invention will be made more evident by the following detailed description of two embodiments illustrated by way of non-limitative example in the enclosed drawings, in which.

Figure 1:
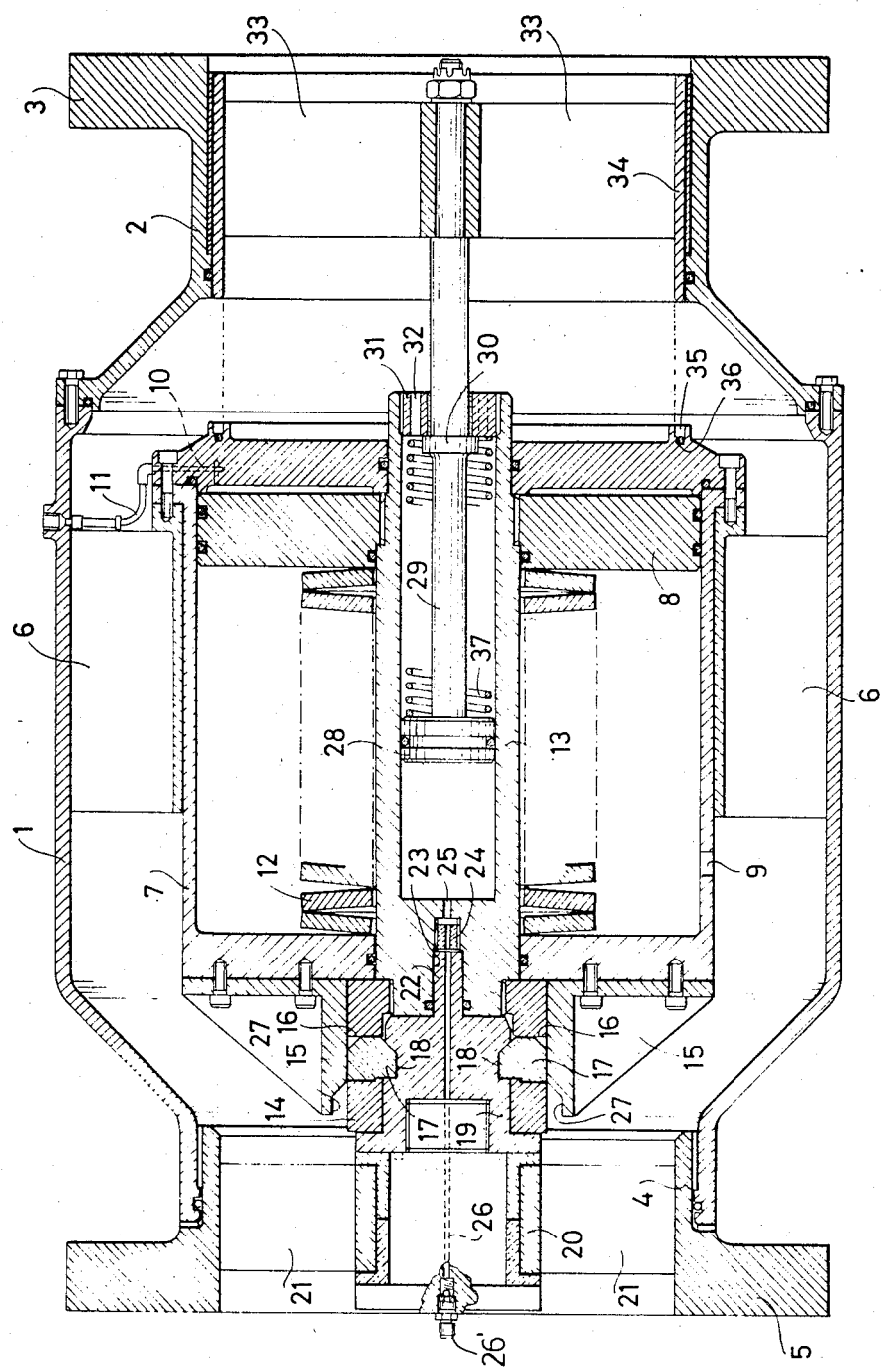
FIG. 1 shows in axial section a fitting according to the invention, provided with a closing shutter for its inlet portion, in normal operating condition.

With reference to FIG. 1, there is illustrated in normal operating conditions a hose fitting, which comprises a tubular outer casing 1 destined for the conveyance of the fluid product and provided, on one hand, with a fixed inlet portion 2 with a connecting flange 3 for a first hose and, on the other hand, with an axially removable outlet portion 4 with a connecting flange 5 for a second hose.

Inside the tubular body 1 there is coaxially arranged and made integral therewith by radial ribs 6 a fixed cylinder 7, in bore or chamber of which a piston 8 is slidingly housed. One or more holes 9 in the left end (looking at FIG. 1) of the cylinder 7 connect its chamber with the surrounding annular space, while one or more passages 10 and relative tubes 11 place in communication the other end of the chamber of the same cylinder 7 with an air tank or with a suitable hydraulic supply (according to the operating mode, as it will explained later on). Cup-like (Belleville) springs 12 preloaded through the above mentioned hydraulic supply elastically push the piston 8 to the right (looking at FIG. 1), that is towards the fixed inlet portion 2 of the fitting.

Inside the fixed cylinder 7 there is coaxially disposed and made integral with the piston 8 an axially movable cylinder 13, to whose left end a cylindric extension 14 is fixed for sliding movement inside projecting portions 15 of the cylinder 7. Said extension 14 has radial holes 16, in which there are slidingly housed shaped pawls 17, which alternatively protrude inwards or outwards from the extension 14.

In the first case, illustrated in FIG. 1, the shaped pawls 17, retained inwards by the above mentioned projecting portions 15, are inserted in shaped radial notches 18 of an axial protuberance 19 of a central hub 20 connected by radial ribs 21 to the outlet portion 4 of the fitting, thus releasably keeping this latter in the joined position of FIG. 1. In such position a central projection 22 on protuberance 19 is inserted a central recess 23 of the cylinder 13, in which there is also inserted a suitably calibrated bore 24, which puts an outlet channel 25 of the cylinder 13 in communication with one end of a facing channel 26. Channel 26 extends coaxially through the hub 20 and relative protuberance 19 and project 22, and has as its opposite end a conventional check valve fitting 26' for use in releasably connecting channel 26 in a conventional manner to a supply of hydraulic fluid under pressure (not illustrated), as noted hereinafter.

Figure 2:
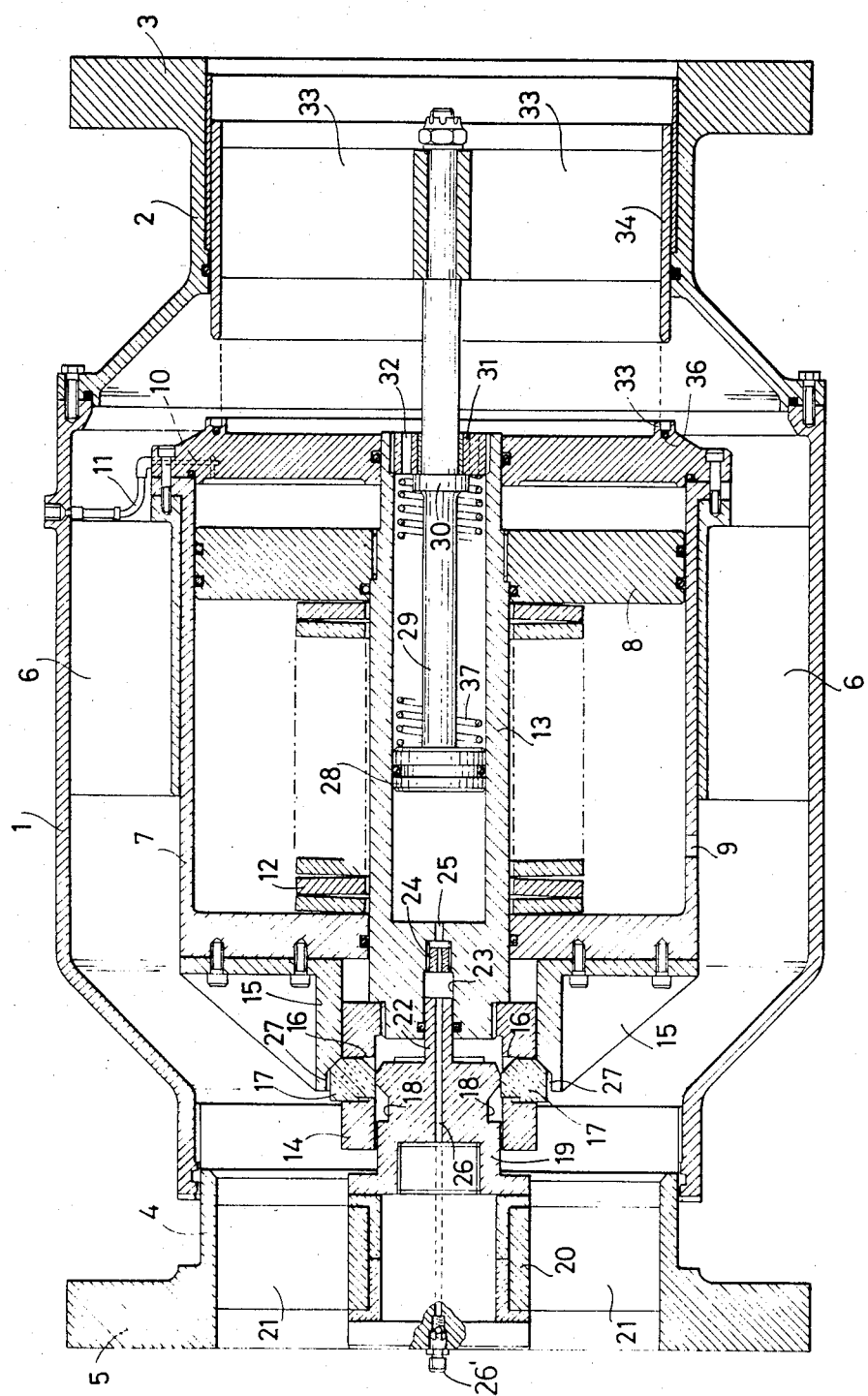
FIG. 2 shows said fitting during the separating and closing operation in response to a strong tensile stress.

In the second case, illustrated in FIG. 2, the shaped pawls 17 are inserted, on the contrary, in more advanced radial shaped cavities 27 formed in the projecting portions 15 of the cylinder 7, thus allowing the protuberance 19 of the hub 20 to slide freely in the bore of the cylinder extension 14.

Inside the movable cylinder 13 there is finally slidingly housed a further piston 28, whose stem 29, provided with a collar 30, passes through a plug 31 (with axial holes 32), situated at the right end of the cylinder 13 and has its own outer end rigidly connected by ribs 33 to a cylindrical wall 34 sliding inside the inlet portion 2 of the fitting. Said cylindrical wall operates as noted hereinafter as closing shutter for the same inlet portion 2, being movable from the opening position of FIG. 1 to the closing position of FIG. 3, in which it is inserted in an annular seat 35, provided with gasket 36, of the fixed cylinder 7. A spring 37 wound around the stem 29 pushes the piston 28 leftwards (looking at FIG. 1), that is in the sense of the closing movement of the shutter 34. By means which form no part of this invention, the shutter 34 is adapted to be shifted to its open position as shown in FIG. 1, by momentarily connecting the fitting 26' in any conventional manner to a supply of hydraulic fluid under pressure, which acts through channel 26 to enter cylinder 13 and to shift the piston 28 into the shutter opening position as shown in FIG. 1.

In the normal working conditions, as already said, the fitting is as in FIG. 1, that is with the outlet portion 4 joined to the other part of the fitting as a result of the fact that the piston 8 is kept in end-stroke position by the spring 12 and by the thrust of the fluid product (entering the cylinder 7 through the hole 9), which exceed the thrust exerted by the same fluid product on the outlet portion 4 of the fitting. At the same time the fluid products (entering the cylinder 13 through the passages 26, 25 and 32) exert on the two faces of the piston 28 forces of different amounts (being different the areas), from which originates a resulting force directed towards right, which keeps the shutter 34 in opening position. The chamber on the right of the piston 8 (looking at FIG. 1) is connected by the passages 10 and 11 to an air tank at atmospheric pressure.

Substantially nothing happens if the fitting is subjected to a low tensile stress. In such case, in fact, it may perhaps occur a limited axial moving of the piston 8 and of the cylinder 13 with consequent limited axial moving of the extension 14 of the cylinder 13 in the fixed projection 15, but, if the shaped pawls 17 do not reach the cavities 27, this is not sufficient to cause the release of the protuberance 19 and the consequent separation of the outlet portion 4. At the end of the tensile stress, the springs 12 are then able to return the system in the normal position of FIG. 1.

If, on the contrary, the fitting is subjected to a tensile effort so high as to allow the shaped pawls 17 to reach the more advanced cavities 27 (FIG. 2), then the same pawls are allowed to be dislodged from the notches 18 of the protuberance 19 by virtue of the sliding contact between the bevels of the pawls 17 and of the notches 18, thus leaving free the outlet portion 4 to separate from the other part of the fitting. At the same time the abutting engagement existing between the plug 31 of the cylinder 13 and the collar 30 of the stem 29 of the piston 28 obliges the shutter 2 to follow the cylinder 13, starting the closing movement.

Figure 3:
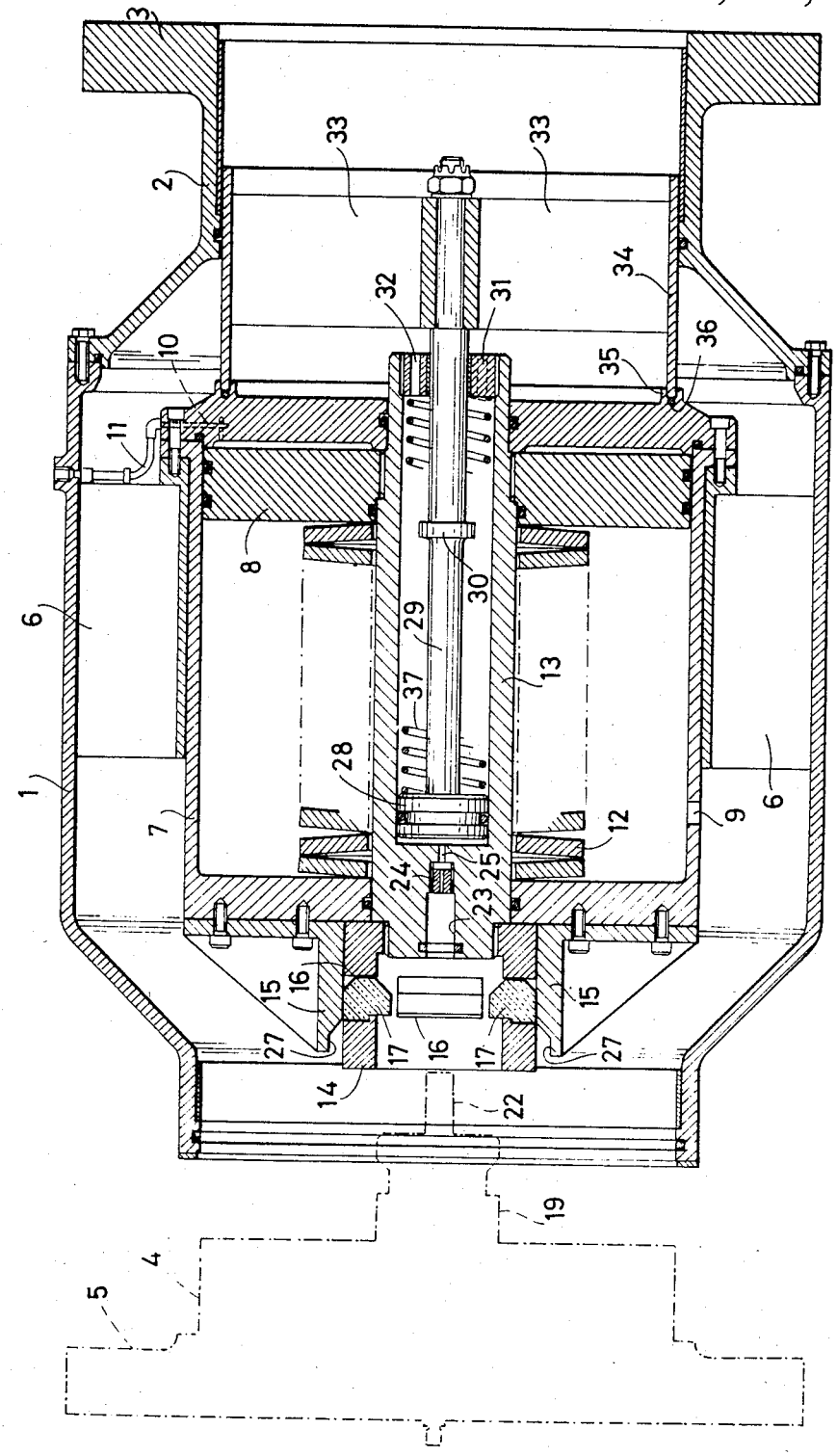
FIG. 3 shows said fitting once the separation and closure have been executed.

When the outlet portion 4 has, and as shown by broken lines in FIG. 3, become disconnected from the other part of the fitting, the fluid previously retained in the left chamber of the cylinder 13 can progressively go out therefrom through the channel 25 with a speed fixed by the narrow passage 24. Consequently, under the thrust of the spring 37 and while the cylinder 13 is brought back by the piston 8 under the thrust of the springs 12, the piston 28 advances, bringing the shutter 34 up to the position of closure of the inlet portion 2 (FIG. 3).

If desired, the separation of the two parts of the fitting and the closing of the shutter 34 can be carefully controlled, instead of being created by a casual occurrence. In such case the passages 11 and 10 are attached to a hydraulic supply (for example oil), which stresses the piston 8 to move towards left (looking at FIG. 1) against the action of the springs 12 and up to the position of FIG. 2. At this point, as previously explained, the outlet portion 4 separates from the other part of the fitting, the channel 25 opens, the piston 28 advances and the shutter 34 consequently moves to the closing position.

Figure 4:
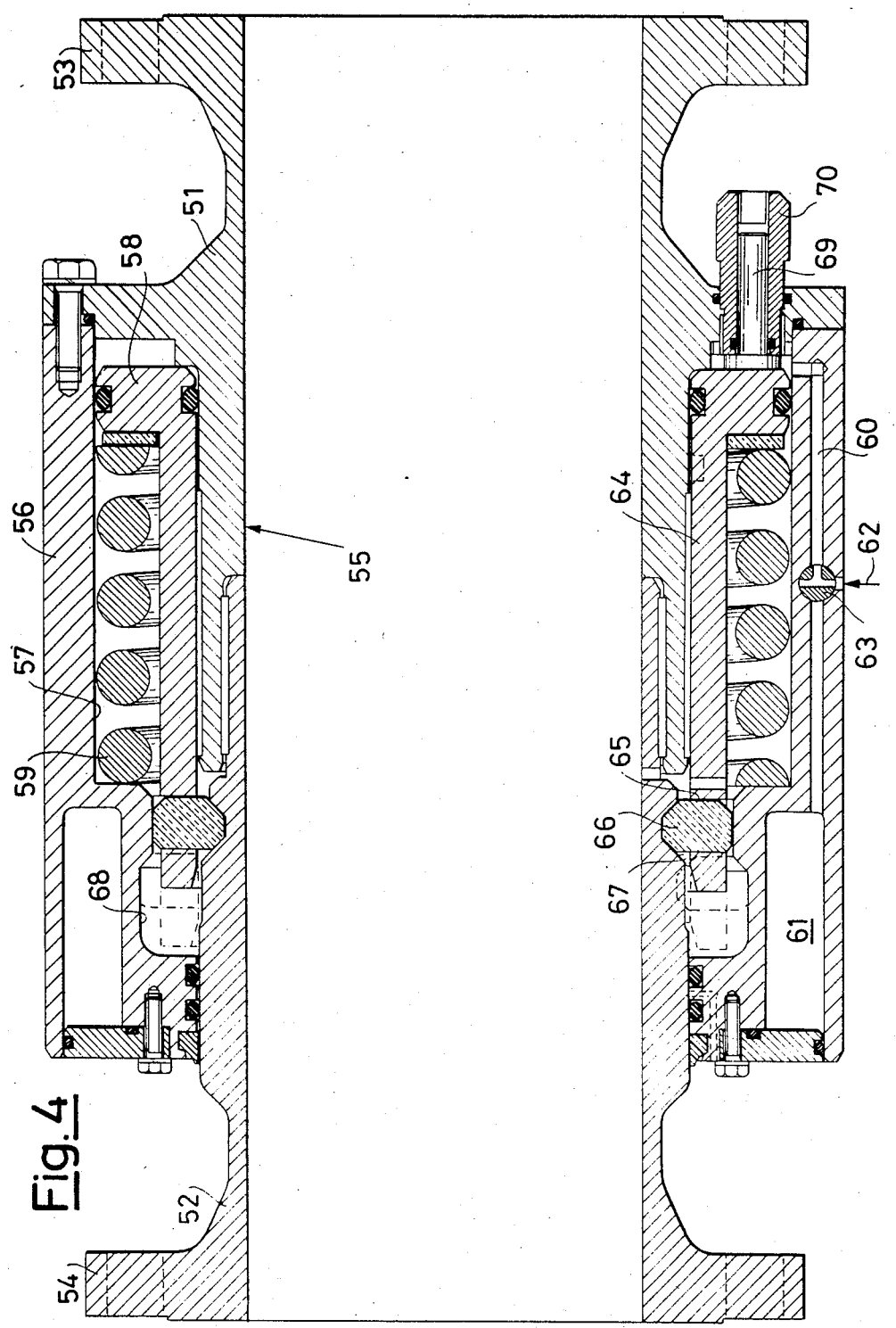
FIG. 4 shows in axial section, in normal operating condition, another embodiment of said fitting, which does not include a closing shutter for its inlet portion.

Referring now to FIG. 4, there is illustrated a simpler embodiment of the fitting according to the invention, which does not include any shutter or other closing member for the inlet portion of the fitting. More precisely, an inlet portion 51 and an outlet portion 52, provided with respective flanges 53 and 54 for the connection to respective hoses, define a single cylindrical inner casing 55 without any valve member, through which the fluid product can freely pass during the transfer. A cylindric body 56 is axially situated around the two casing portions 51 and 52 and rigidly connected to the inlet portion 51, defining around the above mentioned portions an annular chamber 57 in which a piston 58 is slidingly housed. A spring 59 reacts against one face of the piston 58 while at the other side there opens a passage 60 which can be alternatively connected to an air tank 61 or to an oil supply 62 according to the position of a three-way valve 63. With the piston 58 is integrally attached an axially movable cylinder 64, whose left end (looking at FIG. 4) has radial holes 65, in which are slidingly housed respective shaped pawls 66, which move alternately inwards or outwards so as to respectively go into radial shaped notches 67 of the outlet portion 52 (if the cylinder 64 is in the retracted position as shown by four lines in FIG. 4) or into receiving spaces 68 of the fixed cylinder 56 (if the cylinder 64 is in the advanced position illustrated in dash-dot lines in FIG. 4). There is finally arranged a piston 69, housed in a cylinder 70, for the possible direct mechanical operation of the piston 58.

The working way of the fitting of FIG. 4 is substantially equal to that of the fitting of FIGS. 1-3, naturally without closure of the inlet portion 51. Also in this case, in fact, a strong tensile stress due to casual occurrence (with the passage 60 connected to the air tank 61) or a hydraulic control applied to the piston 8 (with the passage 60 connected to the oil supply 62) causes the advancement of the movable cylinder 64 from the back position of FIG. 4 (in which the shaped pawls 66, inserted in the radial notches 65 and externally retained by the fixed cylinder 56, make integral the two casing portions 51 and 52) to that advanced illustrated in dash-dot lines in FIG. 4 (in which the pawls 66, moving outwards, leave free the outlet portion 52). The outlet portion 52 can thus separate from the inlet portion 51, thus separating the respective hoses. The piston 69 operates as safety mechanical control for a possible missed hydraulic supply to the piston 58.

I claim:

1. A hose fitting comprising a fluid product conveying tubular casing having a fixed inlet portion attachable to a first hose and an axially removable outlet portion attachable to a second hose, a fixed cylinder coaxially connected to said inlet portion, a piston slidingly housed in said fixed cylinder, thrust means acting on said piston normally to urge it towards said inlet portion with a force greater than that exerted on said outlet portion by the fluid product fed to said outlet portion from said inlet portion, an axially movable cylinder coaxially housed in said fixed cylinder and integral with said piston, means for releasably connecting together said movable cylinder and said outlet portion, and operative in response to axial stresses between said inlet and outlet portions initially to cause movement of said outlet portion, said movable cylinder and said piston in unison with respect to said inlet portion and against the resistance of said thrust means, and then, if said stresses are greater than a predetermined value, to cause said connecting means operatively to release said outlet portion from said movable cylinder and thereby from said inlet portion, said fixed cylinder being coaxially housed inside said tubular casing.

2. A hose fitting as defined in claim 1, including a closing shutter for said casing inlet portion, a further piston slidingly housed in said movable cylinder and integral with said closing shutter, further thrust means acting on said further piston to urge it towards said casing outlet portion against the resistance of a hydraulic fluid which releasably holds said shutter in an opening position, and a discharge bore with prefixed calibration which is opened upon the removal of said casing inlet portion, thereby to release said hydraulic fluid and to effect consequent advancement of said further piston and displacement of said shutter to a closing position.

3. A hose fitting as defined in claim 1, including a closing shutter for said casing inlet portion, a further piston slidingly housed in said movable cylinder and integral with said closing shutter, further thrust means acting on said further piston to urge it towards said casing outlet portion against the resistance of a hydraulic fluid which releasably holds said shutter in an opening position, and a discharge bore with prefixed calibration which is opened upon the removal of said casing inlet portion, therby to release said hydraulic fluid and to effect consequent advancement of said further piston and displacement of said shutter to a closing position, said releasable connecting means comprising a plurality of blocking pawls housed in a radially movable way in respective circumferentially spaced holes of an axial extension of said movable cylinder, said axial extension being slidingly housed inside projecting portions of the fixed cylinder and having a bore surrounding an axial protuberance on said outlet portion of the outer casing, said pawls being normally kept by said projecting portions of the fixed cylinder in an inner position in which they are inserted in radial notches of said axial protuberance of said outlet portion so as releasably to keep said protuberance in said bore in said axial extension, said pawls being automatically movable to an outer released position from said notches for the automatic release of said outlet portion in the case that a tensile stress causes an advancement of said movable cylinder towards said outlet portion so as to allow said pawls to reach more advanced cavities of said projecting portions of the fixed cylinder, said discharge bore with prefixed calibration being disposed in said movable cylinder in facing position with respect to said axial protuberance of said outlet portion, so as to be automatically opened by the exit of said axial protuberance from said axial extension of the movable cylinder, when said outlet portion is released.

4. A hose fitting as defined in claim 1, said releasable connecting means comprising a plurality of blocking pawls housed in a radially movable way in respective circumferentially spaced holes of an axial extension of said movable cylinder, said axial extension being slidingly housed inside projecting portions of the fixed cylinder and having a bore surrounding an axial protuberance on said outlet portion of the outer casing, said pawls being normally kept by said projecting portions of the fixed cylinder in an inner position in which they are inserted in radial notches of said axial protuberance of said outlet portion so as releasably to keep said protuberance in said bore in said axial extension, said pawls being automatically movable to an outer released position from said notches for the automatic release of said outlet portion in the case that a tensile stress causes an advancement of said movable cylinder towards said outlet portion so as to allow said pawls to reach more advanced cavities of said projecting portions of the fixed cylinder, said pawls having suitable shaped bevels, which engage with analogous bevels of said radial notches of said axial protuberance so as to be urged by the latter to shift out of said radial notches and into said radial cavities of said projecting portions of the fixed cylinder when the advancement of the movable cylinder is such as to bring said pawls into said axial cavities.

5. A hose fitting comprising a fluid product conveying tubular casing having a fixed inlet portion attachable to a first hose and an axially removable outlet portion attachable to a second hose, a fixed cylinder coaxially connected to said inlet portion, a piston slidingly housed in said fixed cylinder, thrust means acting on said piston normally to urge it toward said inlet portion with a force greater than that exerted on said outlet portion by the fluid product fed to said outlet portion from said inlet portion, an axially movable cylinder coaxially housed in said fixed cylinder and integral with said piston, means for releasably connecting together said movable cylinder and said outlet portion, and operative in response to axial stresses between said inlet and outlet portions initially to cause movement of said outlet portion, said movable cylinder and said piston in unison with respect to said inlet portion and against the resistance of said thrust means, and then, if said stresses are greater than a predetermined value, to cause said connecting means operatively to release said outlet portion from said movable cylinder and thereby fitting said inlet portion, a closing shutter for said casing inlet portion, a further piston slidingly housed in said movable cylinder and integral with said closing shutter, further thrust means acting on said further piston to urge it towards said casing outlet portion against the resistance of a hydraulic force which releasably holds said shutter in an opening position, and a discharge bore with prefixed calibration which is opened upon the removal of said casing inlet portion, thereby to release said hydraulic retaining force and to effect consequent advancement of said further piston and displacement of said shutter to a closing position.

6. A hose fitting comprising a fluid product conveying tubular casing having a fixed inlet portion attachable to a first hose and an axially removable outlet portion attachable to a second hose, a fixed cylinder coaxially connected to said inlet portion, a piston slidingly housed in said fixed cylinder, thrust means acting on said piston normally to urge it toward said inlet portion with a force greater than that exerted on said outlet portion by the fluid product fed to said outlet portion from said inlet portion, an axially movable cylinder coaxially housed in said fixed cylinder and integral with said piston, means for releasably connecting together said movable cylinder and said outlet portion, and operative in response to axial stresses between said inlet and outlet portions initially to cause movement of said outlet portion, said movable cylinder and said piston in unison with respect to said inlet portion and against the resistance of said thrust means, and then, if said stresses are greater than a predetermined value, to cause said connecting means operatively to release said outlet portion from said movable cylinder and thereby from said inlet portion, a closing shutter for said casing inlet portion, a further piston slidingly housed in said movable cylinder and integral with said closing shutter, further thrust means acting on said further piston to urge it towards said casing outlet portion against the resistance of a hydraulic fluid which releasably holds said shutter in an opening position, and a discharge bore with prefixed calibration which is opened upon the removal of said casing inlet portion, therby to release said hydraulic fluid and to effect consequent advancement of said further piston and displacement of said shutter to a closing position, said releasable connecting means comprising a plurality of blocking pawls housed in a radially movable way in respective circumferentially spaced holes of an axial extension of said movable cylinder, said axial extension being slidingly housed inside projecting portions of the fixed cylinder and having a bore surrounding an axial protuberance on said outlet portion of the outer casing, said pawls being normally kept by said projecting portions of the fixed cylinder in an inner position in which they are inserted in radial notches of said axial protuberance of said outlet portion so as releasably to keep said protuberance in said bore in said axial extension, said pawls being automatically movable to an outer released position from said notches for the automatic release of said outlet portion in the case that a tensile stress causes an advancement of said movable cylinder towards said outlet portion so as to allow said pawls to reach more advanced cavities of said projecting portions of the fixed cylinder, said discharge bore with prefixed claibration being disposed in said movable cylinder in facing position with respect to said axial protuberance of said outlet portion, so as to be atomatically opened by the exit of said axial protuberance from said axial extension of the movable cylinder when said outlet portion is released.

7. A hose fitting comprising a fluid product conveying tubular casing having a fixed inlet portion attachable to a first hose and an axially removable outlet portion attachable to a second hose, a fixed cylinder coaxially connected to said inlet portion, a piston slidingly housed in said fixed cylinder, thrust means acting on said piston normally to urge it toward said inlet portion with a force greater than that exerted on said outlet portion by the fluid product fed to said outlet portion from said inlet portion, an axially movable cylinder coaxially housed in said fixed cylinder and integral with said piston, means for releasably connecting together said movable cylinder and said outlet portion, and operative in response to axial stresses between said inlet and outlet portions initially to cause movement of said outlet portion, said movable cylinder and said piston in unison with respect to said inlet portion and against the resistance of said thrust means, and then, if said stresses are greater than a predetermined value, to cause said connecting means operatively to release said outlet portion from said movable cylinder and thereby from said inlet portion, said releasable connecting means comprising a plurality of blocking pawls housed in a radially movable way in respective circumferentially spaced holes of an axial extension of said movable cylinder, said axial extension being slidingly housed inside projecting portions of the fixed cylinder and having a bore surrounding an axial protuberance on said outlet portion of the outer casing, said pawls being normally kept by said projecting portions of the fixed cylinder in an inner position in which they are inserted in radial notches of said axial protuberance of said outlet portion so as releasably to keep said protuberance in said bore in said axial extension, said pawls being automatically movable to an outer released position from said notches for the automatic release of said outlet portion in the case that a tensile stress causes an advancement of said movable cylinder towards said outlet portion so as to allow said pawls to reach more advanced cavities of said projecting portions of the fixed cylinder, said paws having suitably shaped bevels, which engage with analogous bevels of said radial notches of said axial protuberance so as to be urged by the latter to shift out of said radial notches and into said radial cavities of said projecting portions of the fixed cylinder when the advancement of the movable cylinder is such as to bring said pawls into said axial cavities.

8. A hose fitting comprising a fluid product conveying tubular casing having a fixed inlet portion attachable to a first hose and an axially removable outlet portion attachable to a second hose, a fixed cylinder coaxially connected to said inlet portion, a piston slidingly housed in said fixed cylinder, thrust means acting on said piston normally to urge it toward said inlet portion with a force greater than that exerted on said outlet portion by the fluid product fed to said outlet portion from said inlet portion, an axially movable cylinder coaxially housed in said fixed cylinder and integral with said piston, means for releasably connecting together said movable cylinder and said outlet portion, and operative in response to axial stresses between said inlet and outlet portions initially to cause movement of said outlet portion, said movable cylinder and said piston in unison with respect to said inlet portion and against the resistance of said thrust means, and then, if said stresses are greater than a predetermined value, to cause said connecting means operatively to release said outlet portion from said movable cylinder and thereby from said inlet portion, said releasable connecting means comprising a plurality of blocking pawls housed in a radially movable way in respective circumferentially spaced holes of an axial extension of said movable cylinder, said axial extension being slidingly housed inside projecting portions of the fixed cylinder and having a bore surrounding an axial protuberance on said outlet portion of the outer casing, said pawls being normally kept by said projecting portions of the fixed cylinder in an inner position in which they are inserted in radial notches of said axial protuberance of said outlet portion so as releasably to keep said protuberance in said bore in said axial extension, said pawls being automatically movable to an outer released position from said notches for the automatic release of said outlet portion in the case that a tensile stress causes an advancemenet of said movable cylinder towards said outlet portion so as to allow said pawls to reach more advanced cavities of said projecting portions of the fixed cylinder, said pawls having suitably shaped bevels, which engage with analogous bevels of said radial notches of said axial protuberance so as to be urged by the latter to shift out of said radial notches and into said radial cavities of said projecting portions of the fixed cylinder when the advancement of the movable cylinder is such as to bring said pawls into said axial cavities, said fixed cylinder being coaxially disposed around said tubular casing to define therewith an annular housing chamber for said piston and said movable cylinder, said releasable connection means comprise a plurality of blocking pawls slidingly housed in respective radial holes of said movable cylinder, said pawls being normally kept by said fixed cylinder inside corresponding radial notches of said outlet portion of the casing and upon the advancement of said movable cylinder being movable with it into receiving spaces of said fixed cylinder for their exit from said radial notches and the consequent release of said outlet portion from said inlet portion of the casing.

\* \* \* \* \*